Oct. 13, 1936.                H. TRAMM ET AL                2,057,282
                        PRODUCTION OF HYDROCYANIC ACID
                              Filed Nov. 29, 1933
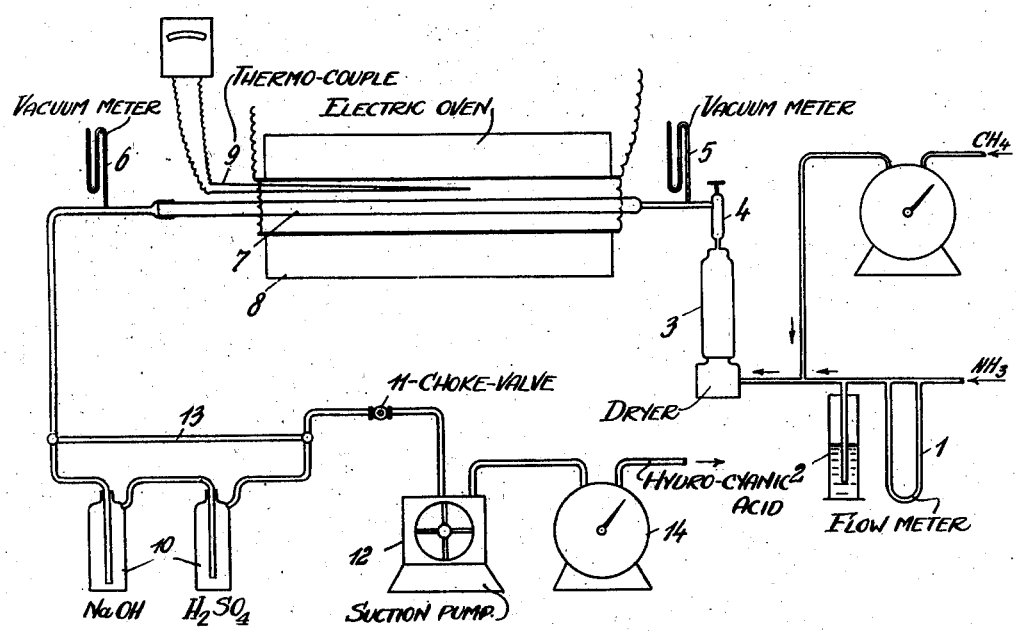
Inventor:
Heinrich Tramm and Walter Grimme Patented Oct. 13, 1936

2,057,282

UNITED STATES PATENT OFFICE 2,057,282

PRODUCTION OF HYDROCYANIC ACID

Heinrich Tramm, Oberhausen-Holten, and Walter Grimme, Oberhausen-Sterkrade, Germany, assignors to Ruhrchemie Aktiengesellschaft, Oberhausen-Holten, Germany Application November 29, 1933, Serial No. 700,280
In Germany December 3, 1932

24 Claims. (Cl. 23—151)

Our invention relates to the production of hydrocyanic acid (hydrogen cyanide) and more especially to the synthesis of hydrocyanic acid by combining at a high temperature ammonia with a hydrocarbon such as methane or the like or a gas mixture containing the same.

It is an object of our invention to provide means whereby the reaction between the ammonia and the hydrocarbon is influenced in such manner that a high yield of hydrocyanic acid is obtained under economically favorable conditions.

We are aware that hydrocyanic acid has already been produced by the interaction of ammonia and a hydrocarbon at a high temperature.

It has for instance been suggested to react methane with ammonia in the presence of catalysts, this process resulting in a gas mixture formed in the reaction containing besides hydrogen not more than 10% hydrocyanic acid calculated on the ammonia.

It has further been attempted to produce hydrocyanic acid by subjecting a mixture of methane and ammonia to the action of electrical high-tension discharges, however this process involves the great drawback that heat of reaction must be supplied by electricity.

Another process of producing hydrocyanic acid from a mixture of ammonia and methane requires the addition of oxygen and the presence of catalysts. Apart from the necessity of using catalysts, which require repeated purification, this latter process involves the drawback that, owing to the presence of oxygen in the reaction mixture, the resulting gas mixture contains, besides the hydrocyanic acid, only useless constituents.

We have now found that hydrocyanic acid can be produced with particular advantage by pure thermic reaction from mixtures of ammonia and methane or hydrocarbons having a higher molecular weight than methane by subjecting the gas mixture during a short period of time to the influence of a high temperature in a reaction chamber heated from the outside and having non-porous (gas-proof) walls, if the pressure within the reaction chamber is kept substantially below atmospheric pressure.

We have found that the process may be carried out at temperatures within the range of about 800 to 1600° C. At temperatures ranging between 1300 and 1500° the yield of hydrocyanic acid rises in proportion to the temperature. If for instance a gas mixture containing 1 ammonia : 2 methane is heated for 0.06 second to 1250° C., no hydrocyanic acid worth speaking of is formed. At 1300° C. about 20% of the ammonia is converted into hydrocyanic acid. The same yield is obtained at about 1380° C., if the gas mixture is heated to this temperature for only one half of the time (0.03 second), and at 1500° C., if the time of heating the gas mixture is reduced to 0.01 second. On the other hand, if the mixture is heated at 1380° C. during 0.065 second, 45%, and at 1500° C., 75% of the ammonia contained in the starting gas mixture is converted into hydrocyanic acid. The temperature may even be raised to 1600° C. and above and in any case higher temperatures have proven to improve the yield.

The fact that in a purely thermic process of the kind described the reaction can be carried through at a pressure below normal at the high temperatures described, is remarkable for according to theory in view of the state of equilibrium of ammonia this latter compound should be destroyed under a pressure below normal, apart from the fact that this is a case of the combination of two components to form the HCN molecule. By operating at a pressure below normal the yield of hydrocyanic acid, which at normal pressure and in the presence of catalysts does not rise beyond 10%, can be raised to 60% and above without any catalysts being required.

We have further found that simultaneously with the formation of hydrocyanic acid the presence of ammonia favorably influences the well known conversion of the hydrocarbons present in the starting gas mixture into hydrocarbons of higher carbon content, more especially into acetylene. We believe this favorable influence to be due to the fact that when the ammonia is split up, hydrogen is liberated, which acts to stabilize the compounds resulting during the formation of the hydrocarbons with higher carbon content.

By varying the percentage of ammonia we are enabled to vary the proportion of hydrocyanic acid to the hydrocarbons and more especially to the acetylene formed in the reaction in its dependence upon the temperature and the velocity of flow of the gases. The percentage of ammonia converted into hydrocyanic acid will be the greater, the smaller the ammonia concentration in the starting gas mixture.

The methane which is not converted into hydrocyanic acid is partly converted into acetylene, the percentage of acetylene in the product of reaction rising in direct proportion to the concentration of methane in the starting gas mixture and approaching the yield of acetylene obtained from pure methane under the corresponding conditions of operation.

In practicing our invention we have for instance passed a gas mixture consisting of 100 parts by volume methane and 7.5 parts by volume ammonia at the rate of 107.5 litres per hour through a tube made of non-porous aluminium oxide or a silicate containing aluminium oxide, the tube having an inner diameter of 10 mms. and being heated from the outside through a length of 80 cms. to 1450° C., the pressure within the tube being maintained at 50 mms. mercury column. Under these conditions of operation a gas mixture was obtained containing 12.5% acetylene and 2.7% HCN, which means that 60% of the ammonia present in the starting gas mixture was converted into hydrocyanic acid, while 36% of the methane originally present was converted into acetylene.

After extraction of the hydrocyanic acid and the acetylene a gas mixture was left over containing 46.6% $CH_4$, 52% $H_2$ and 1.4% $N_2$, which can be used for a number of technical purposes, for instance as illuminating gas.

In carrying the process through on a laboratory scale we made use of an arrangement of apparatus such as illustrated in a purely diagrammatic manner in the drawing affixed to this specification and forming part thereof, in which 1 is a flowmeter, 2 a pressure regulator, 3 a dryer, 4 a reducing valve, 5 and 6 vacuum meters, 7 the reaction tube, 8 an electric oven with heating resistances, 9 a thermo couple, 10 washers containing caustic soda solution and sulphuric acid, respectively, 11 a choke valve and 12 a suction pump.

The methane used in these tests contained 94% $CH_4$, 0.7% $C_nH_n$, 1.0% $O_2$, 0.2% CO, 0.5% $H_2$ and 3.6% $N_2$. The ammonia issuing from a steel bottle passed through the flowmeter 1 and the pressure regulator 2 and, together with the methane, through the dryer 3 filled with caustic potash and the reducing valve 4 into the tube 7 (consisting of aluminum oxide) of 10 mms. inner diameter, which was arranged in the oven 8 measuring 800 mms. in length. The gas mixture escaping from the tube 7 was either conducted through the washers filled with NaOH and $H_2SO_4$, respectively, or through a pipe 13 directly to the suction pump 12. Before entering and after escaping the tube the gases acted on the vacuum meters 5 and 6 in order to ascertain the drop of pressure and the average pressure in the reaction chamber respectively. In the first washer the hydrocyanic acid, in the second washer the undestroyed ammonia was washed out. In the caustic potash solution in the first washer the quantity of hydrocyanic acid absorbed was ascertained by adding potassium iodide and titrating with silver nitrate, while the quantity of ammonia absorbed was ascertained by titration of the sulphuric acid in the second washer. The time during which the washing out processes proceeded was ascertained and the quantities by volume of methane and ammonia corresponding to the reaction products absorbed in the washers were determined with the aid of the known velocities of flow. The gas escaping from the suction pump, being freed from hydrocyanic acid and ammonia, was measured in a gas meter 14 and stored for analysis.

In actual practice we have found it particularly useful to heat the tube or tubes by means of gas preheated in regenerators, utilizing for this purpose the oven described in a copending application, Serial No. 641,888, filed November 9, 1932, by Heinrich Tramm and Reinhard Jung. The use of tubes of large diameters, when operating at reduced pressure, was found to lead to higher losses in ammonia and to a smaller yield of hydrocyanic acid, as shown by the following tests:

1. Internal diameter of tube 10 mms. Length of tube 800 mms.

| Temp. °C. | Pressure mms. mercury | Ratio of $CH_4:NH_3$ | Heating period secs. | % $NH_3$ converted into HCN | % $NH_3$ recovered | % $NH_3$ destroyed |
|---|---|---|---|---|---|---|
| 1380 | 50 | 1.5:1 | 0.0318 | 19.6 | 52.5 | 27.9 |
| 1380 | 50 | 1.5:1 | 0.0455 | 25.0 | 48.0 | 27 |

2. Internal diameter of tube 27 mms. Length of tube 400 mms.

| 1380 | 67 | 1.5:1 | 0.045 | 4.8 | 35 | 60.2 |
|---|---|---|---|---|---|---|
| 1380 | 67 | 1.5:1 | 0.101 | 17.4 | 10.7 | 71.9 |

In accordance with an increased formation of hydrocyanic acid the percentage of ammonia and methane in the reaction products drops and at the same time the percentage of hydrogen rises as shown in the following schedule illustrating the treatment of a mixture of $2CH_4$ and $1NH_3$:

| Temp. °C. | Pressure mms. mercury | Time of heating seconds | % $NH_3$ calculated as HCN | % $CH_4$ calculated as HCN | % HCN in the gas mixture formed | Gas mixture after extraction of HCN | | | |
|---|---|---|---|---|---|---|---|---|---|
| | | | | | | $C_2H_2$ % | $H_2$ % | $CH_4$ % | $N_2$ % |
| 1380 | 58 | 0.0225 | 17 | 8.5 | 4.5 | 6.6 | 47.0 | 34.0 | 2.7 |
| 1380 | 58 | 0.0335 | 24.5 | 12.6 | 6.1 | 7.6 | 61.7 | 27.9 | 1.6 |
| 1380 | 55 | 0.049 | 36 | 18 | 7.0 | 7.5 | 70.0 | 19.7 | 2.8 |
| 1500 | 45 | 0.023 | 38 | 19 | 7.0 | 8.0 | 65.0 | 21.5 | 1.8 |
| 1500 | 45 | 0.0366 | 50 | 25 | 9.0 | 8.5 | 70.3 | 17.0 | 2.7 |
| 1500 | 45 | 0.0500 | 65 | 32 | 12.0 | 9.0 | 75.4 | 11.7 | 2.5 |

The losses of ammonia by dissociation have been found to be the lower, the higher the temperature, as shown by the following schedule:

| Temp. °C. | Time of heating seconds | % $NH_3$ calculated as HCN | % $NH_3$ in the reaction product | % $NH_3$ destroyed |
|---|---|---|---|---|
| 1250 | 0.0225 | 0.68 | 71 | 28 |
| 1250 | 0.0317 | 1.20 | 75 | 23.8 |
| 1250 | 0.047 | 2.6 | 67 | 30.0 |
| 1380 | 0.0225 | 17 | 60 | 23 |
| 1380 | 0.0335 | 24.5 | 54 | 21.5 |
| 1380 | 0.049 | 36 | 42.5 | 21.5 |
| 1500 | 0.023 | 38 | 45 | 17.0 |
| 1500 | 0.0366 | 50 | 35 | 15 |
| 1500 | 0.0500 | 65 | 27 | 8 |

This shows that the temperature coefficient of the velocity of decomposition of the ammonia is smaller than the corresponding coefficient of the velocity of formation of the hydrocyanic acid.

We have further found that the dissociation of ammonia occurring through the catalytic action of minute iron particles in the walls of the reaction chamber will be far greater, when starting the operation in a fresh tube, than after the reaction has proceeded for some time, as shown by the following schedule relating to an operation at 1380° C. with a non-packed tube of the material above described, the pressure being 66 mms. mercury column:

| Number of minutes after starting operation | Litres $CH_4$ per hour | Litres $NH_3$ per hour | Litres gas formed per hour | % $NH_3$ converted into HCN | % $NH_3$ destroyed |
|---|---|---|---|---|---|
| 5 | 22.5 | 30 | 100 | 12.1 | 75 |
| 15 | 22.5 | 30 | 96 | 15.1 | 70 |
| 30 | 22.5 | 30 | 93 | 18.1 | 65 |
| 45 | 22.5 | 30 | 86 | 20.0 | 58 |
| 60 | 22.5 | 30 | 78 | 21.0 | 52 |
| 75 | 22.5 | 30 | 76 | 21.0 | 50 |

In some cases the addition of small quantities of inert gases containing combined oxygen, such as steam, has been found to exert an advantageous effect on the reaction, probably by poisoning such active points in the reaction chamber which may be formed by minute particles of iron or the like, whereby the undesirable catalytic decomposition of the ammonia into its elements is brought about.

Before extracting the acetylene from the gas mixture resulting in the reaction the hydrocyanic acid may be extracted for instance by washing the mixture with caustic soda solution.

If a mixture of ethane with ammonia was used as starting material, the yields obtained with methane were found to be obtained at lower temperatures, since ethane will combine with ammonia to form hydrocyanic acid at a lower temperature. The following schedule shows that with a mixture of pure ethane and ammonia in the proportion of 2:1 the yields obtained with methane at 1380° C. are obtained at temperatures as low as 1300° C.:

| Temp. °C. | Pressure mms. mercury | Period of heating seconds | % NH$_3$ calculated as HCN | % NH$_3$ not destroyed | Gas mixture formed after removal of HCN and NH$_3$ | | | | |
|---|---|---|---|---|---|---|---|---|---|
| | | | | | C$_2$H$_2$ % | H$_2$ % | C$_2$H$_6$ % | CH$_4$ % | N$_2$ % |
| 1300 | 45 | 0.024 | 12 | 68 | 24.7 | 59.9 | | 9.8 | 1.2 |
| 1300 | 55 | 0.040 | 22 | 58 | 22.8 | 62.3 | | 8.0 | 3.0 |
| 1400 | 45 | 0.0317 | 39 | 58 | 22.0 | 65.0 | | 7.1 | 1.1 |

We have further reacted ammonia with acetylene. Since the intermediary formation of acetylene from methane or other hydrocarbons is accompanied by the formation of hydrogen in excess, we used mixtures of C$_2$H$_2$ and H$_2$ and we found that at 1500° C. and a constant pressure of 50 mms. mercury column almost 100% of the NH$_3$ was converted into HCN, while below 1250° C. the reaction velocity is retarded to the extent of rendering the process uncommercial as shown by the following schedule illustrating the reaction of a gas containing 16% C$_2$H$_2$, 16% NH$_3$ and 65% H$_2$, the pressure being kept within the range of 50 to 70 mms. mercury column:

| Temperature °C. | Period of heating seconds | % NH$_3$ calculated as HCN | % NH$_3$ in the reaction product | % NH$_3$ destroyed |
|---|---|---|---|---|
| 1240 | 0.075 | 25 | 50 | 25 |
| 1300 | 0.06 | 37.5 | 48.5 | 14 |
| 1370 | 0.057 | 55 | 27.5 | 17.5 |
| 1500 | 0.054 | 90 | 5 | 5 |

These figures were ascertained after the apparatus had been in operation for some time.

The dependency of the yields upon the proportion of the gases in the mixtures is substantially the same as described above for methane. The ammonia was found to be converted into hydrocyanic acid the more completely the smaller its concentration in the starting gas, but even with a proportion of C$_2$H$_2$:NH$_3$=1:1 a yield of 85% hydrocyanic acid was obtained at 1500° C. (the mixture being heated during .054 second), while under the same conditions of operation and starting from a mixture of 2CH$_4$ and 1NH$_3$ a conversion of 68% of the introduced ammonia had been obtained.

While the tests made with methane had shown the formation of hydrocyanic acid to be dependent upon the pressure, we found that with a mixture of acetylene and hydrogen in excess (1 acetylene : 4 hydrogen) a rise of pressure affected the reaction to a much lesser degree, so that at a temperature of 1300° C. up to a total pressure of about 200 mms. mercury column no separation of carbon worth speaking of was found to occur. In these tests the yields were found to rise in direct proportion to the rise in pressure as follows, the starting gas containing 18% C$_2$H$_2$, 18% NH$_3$ and 64% H$_2$:

| Temp. °C. | Time of heating seconds | Total pressure in mms. mercury | HCN formed calculated in % of the NH$_3$ introduced | % NH$_3$ recovered | % NH$_3$ destroyed |
|---|---|---|---|---|---|
| 1300 | 0.060 | 50 | 37.5 | 45.0 | 17.5 |
| 1300 | 0.060 | 200 | 59.0 | 29.0 | 12 |
| and with a gas containing 16% C$_2$H$_2$, 13% NH$_3$ and 71% H$_2$ | | | | | |
| 1340 | 0.045 | 48 | 35 | 51 | 14 |
| 1340 | 0.042 | 184 | 58 | 34 | 8 |

Obviously instead of pure methane or another hydrocarbon and pure ammonia, gases or gas mixtures containing same may be reacted with the same effect.

Various changes may be made in the details disclosed in the foregoing specification without departing from the invention or sacrificing the advantages thereof.

We claim:—

1. In the process of producing hydrocyanic acid by reacting a hydrocarbon with ammonia at a high temperature, the step of operating in the absence of material quantities of oxygen at a pressure not substantially exceeding a pressure of the order of 200 mm. of mercury.

2. In the process of producing hydrocyanic acid by reacting a hydrocarbon with ammonia at a high temperature, the step of operating at a pressure of about one tenth of an atmosphere.

3. In the process of producing hydrocyanic acid by reacting a hydrocarbon with ammonia at a high temperature, the steps of heating the reaction mixture in the absence of material quantities of oxygen by external heating while maintaining a pressure not substantially exceeding a pressure of the order of 200 mm. of mercury.

4. In the process of producing hydrocyanic acid by reacting a hydrocarbon with ammonia at a high temperature, the steps of heating the reaction mixture during a fraction of a second in the absence of material quantities of oxygen to a high temperature while maintaining a pressure not substantially exceeding a pressure of the order of 200 mm. of mercury.

5. In the process of producing hydrocyanic acid by reacting a hydrocarbon with ammonia at a high temperature, the steps of heating the reaction mixture during a fraction of a second to a high temperature while maintaining a pressure of about one tenth of an atmosphere.

6. In the process of producing hydrocyanic acid by reacting a hydrocarbon with ammonia at a high temperature, the steps of heating the reaction mixture during a fraction of a second by external heating to a high temperature while maintaining a pressure of about one tenth of an atmosphere.

7. The process of producing hydrocyanic acid, comprising heating a mixture of hydrocarbon and ammonia in the absence of material quantities of oxygen to a temperature ranging between 800 and 1600° C. while maintaining a pressure not substantially exceeding a pressure of the order of 200 mm. of mercury.

8. The process of producing hydrocyanic acid, comprising heating a mixture of a hydrocarbon and ammonia to a temperature ranging between 800 and 1600° C. while maintaining a pressure of about one tenth of an atmosphere.

9. The process of producing hydrocyanic acid, comprising heating a mixture of a hydrocarbon and ammonia in the absence of material quantities of oxygen during a fraction of a second to a temperature ranging between 800 and 1600° C. while maintaining a pressure not substantially exceeding a pressure of the order of 200 mm. of mercury.

10. The process of producing hydrocyanic acid, comprising heating a mixture of a hydrocarbon and ammonia during a fraction of a second to a temperature ranging between 800 and 1600° C. while maintaining a pressure of about one tenth of an atmosphere.

11. The process of producing hydrocyanic acid, comprising heating a mixture of a hydrocarbon and ammonia in the absence of material quantities of oxygen in a reaction chamber with smooth poreless gas-proof walls heated from the outside to a temperature ranging between 800 and 1600° C. while maintaining a pressure not substantially exceeding a pressure of the order of 200 mm. of mercury.

12. The process of producing hydrocyanic acid comprising sucking a mixture of a hydrocarbon and ammonia through a reaction chamber heated, from the outside, to a temperature ranging between 800 and 1600° C., the rate of suction being such that the gas mixture, while being heated to such temperature, is subjected to a pressure of about one tenth of an atmosphere.

13. The process of producing hydrocyanic acid comprising sucking a mixture of a hydrocarbon and ammonia through a reaction chamber with smooth poreless gas-proof walls heated, from the outside, to a temperature ranging between 800 and 1600° C., the rate of suction being such that the gas mixture, while being heated to such temperature, is subjected to a pressure of about one tenth of an atmosphere.

14. The process of producing hydrocyanic acid comprising sucking a mixture of a hydrocarbon and ammonia through a reaction chamber with smooth walls formed of aluminum oxide heated, from the outside, to a temperature ranging between 800 and 1600° C., the rate of suction being such that the gas mixture, while being heated to such temperature, is subjected to a pressure of about one tenth of an atmosphere.

15. The process of producing hydrocyanic acid comprising sucking a mixture of a hydrocarbon and ammonia through a reaction chamber with smooth walls formed of a silicate containing aluminum oxide heated, from the outside, to a temperature ranging between 800 and 1600° C., the rate of suction being such that the gas mixture, while being heated to such temperature, is subjected to a pressure of about one tenth of an atmosphere.

16. The process of producing hydrocyanic acid, comprising heating a mixture of a hydrocarbon and ammonia in the absence of material quantities of oxygen to a temperature ranging between 800 and 1600° C. while maintaining a pressure not substantially exceeding a pressure of the order of 200 mm. of mercury and treating the gaseous product of reaction with an alkaline solution to extract the hydrocyanic acid.

17. The process of producing hydrocyanic acid, comprising heating a mixture of a hydrocarbon and ammonia in the absence of material quantities of oxygen to a temperature ranging between 800 and 1600° C. while maintaining a pressure not substantially exceeding a pressure of the order of 200 mm. of mercury, the percentage of ammonia in the starting gas mixture being so chosen as to favour the formation of hydrocarbons of higher carbon contents than methane, besides the hydrocyanic acid.

18. The process of producing hydrocyanic acid, comprising heating a mixture of a hydrocarbon and ammonia in the absence of material quantities of oxygen in the presence of steam to a temperature ranging between 800 and 1600° C. while maintaining a pressure not substantially exceeding a pressure of the order of 200 mm. of mercury.

19. The process of producing hydrocyanic acid, comprising heating a mixture of methane and ammonia to a temperature ranging between 800 and 1600° C. while maintaining a pressure of about one tenth of an atmosphere.

20. The process of producing hydrocyanic acid, comprising heating a mixture of ethane and ammonia to a temperature ranging between 800 and 1600° C. while maintaining a pressure of about one tenth of an atmosphere.

21. The process of producing hydrocyanic acid, comprising heating a mixture of acetylene and ammonia to a temperature ranging between 800 and 1600° C. while maintaining a pressure of about one tenth of an atmosphere.

22. The process of heating a mixture of methane and ammonia to a temperature ranging between 800 and 1600° C. at a pressure of about one tenth of an atmosphere to produce hydrocyanic acid and acetylene.

23. The process of heating a mixture of ethane and ammonia to a temperature ranging between 800 and 1600° C. at a pressure of about one tenth of an atmosphere to produce hydrocyanic acid and acetylene.

24. The process of producing hydrocyanic acid from a mixture of a hydrocarbon and ammonia in the gaseous phase, which comprises leading such mixture at a rate such as to preclude substantial decomposition of the ammonia and reaction products through a zone maintained at a temperature ranging between 800 and 1600° C. and under a pressure of about one tenth of an atmosphere.

HEINRICH TRAMM.
WALTER GRIMME.